US006698766B2

(12) United States Patent
Simon

(10) Patent No.: US 6,698,766 B2
(45) Date of Patent: Mar. 2, 2004

(54) SLIDE GATE SEALING SYSTEM

(76) Inventor: Richard D. Simon, 3030 Bridgeway, Sausalito, CA (US) 94965

( * ) Notice: Subject to any disclaimer, the term of this patent is extended or adjusted under 35 U.S.C. 154(b) by 0 days.

(21) Appl. No.: 10/448,802

(22) Filed: May 30, 2003

(65) Prior Publication Data

US 2003/0222411 A1 Dec. 4, 2003

Related U.S. Application Data

(60) Provisional application No. 60/383,962, filed on May 30, 2002.

(51) Int. Cl.$^7$ .............................. F16J 15/02; E02B 7/26; E02B 7/36
(52) U.S. Cl. ..................... 277/630; 277/637; 277/638; 277/644; 405/104; 405/106
(58) Field of Search ................................ 405/103, 104, 405/105, 106; 49/348, 340, 341, 362; 277/628, 630, 637, 640, 642, 644, 641, 906, 638

(56) References Cited

U.S. PATENT DOCUMENTS

| | | | | |
|---|---|---|---|---|
| 3,326,002 A | * | 6/1967 | Halpenny | 405/105 |
| 3,333,816 A | * | 8/1967 | Williams et al. | 251/327 |
| 4,226,553 A | | 10/1980 | Whipps | |
| 4,524,950 A | * | 6/1985 | Vitas et al. | 251/326 |
| 4,614,061 A | | 9/1986 | Brocke | |
| 4,700,927 A | | 10/1987 | Henderson | |
| 4,726,709 A | * | 2/1988 | Labelle | 405/103 |
| 4,848,962 A | | 7/1989 | Whipps | |
| 4,877,352 A | * | 10/1989 | Tuttle et al. | 405/104 |
| 4,934,868 A | * | 6/1990 | Hellstrom et al. | 405/104 |
| 5,141,361 A | | 8/1992 | Fontaine | |
| 6,176,493 B1 | | 1/2001 | Whipps | |

FOREIGN PATENT DOCUMENTS

DE 19815415 * 10/1999 ............. F16K/3/02

* cited by examiner

Primary Examiner—Anthony Knight
Assistant Examiner—Vishal Patel
(74) Attorney, Agent, or Firm—Larry D. Johnson; Craig M. Stainbrook; Johnson & Stainbrook, LLP

(57) ABSTRACT

A slide gate sealing system including a seal mounting frame disposed between the longitudinal rails and the intermediate and horizontal end frame members of a slide gate frame, a ball seal disposed in the seal mounting frame and having a mounting tail with a mating surface, a seal retainer to control the deformation of the ball seal under pressure, at least one isolation dam on the mating surface of the ball seal, and a ramping mechanism affixed to the interior side of the horizontal end frame member. The ramping mechanism includes a section of round material attached to the underside of the slide gate blade, and a ramping cam affixed to the interior side of the horizontal end frame member and having an inclined portion upwardly inclined toward the horizontal end frame member, such that when the slide gate blade is moved toward a closed position, the round material and the ramping cam cooperate to urge the slide gate blade upwardly so that the topside of the slide gate blade comes into positive contact with the ball seal.

3 Claims, 4 Drawing Sheets

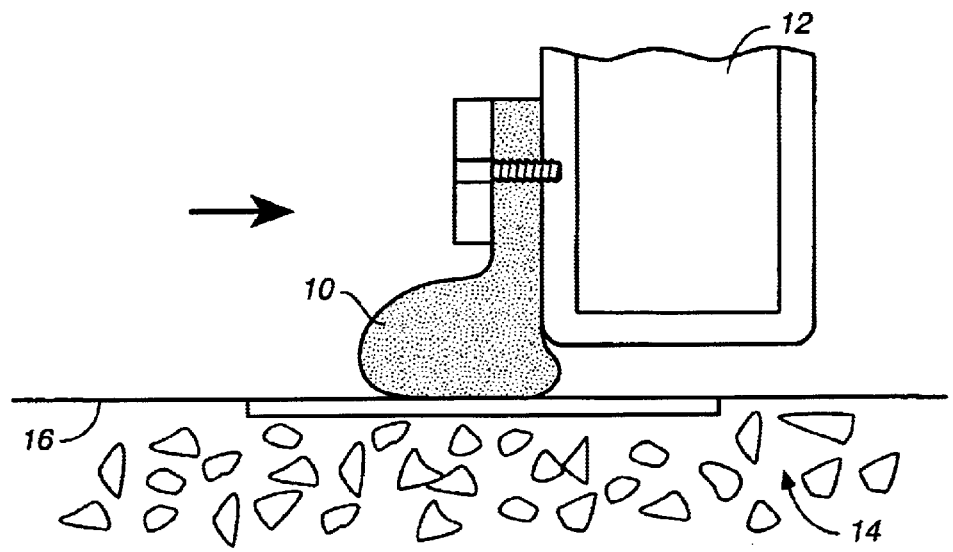
FIG._1A
(PRIOR ART)
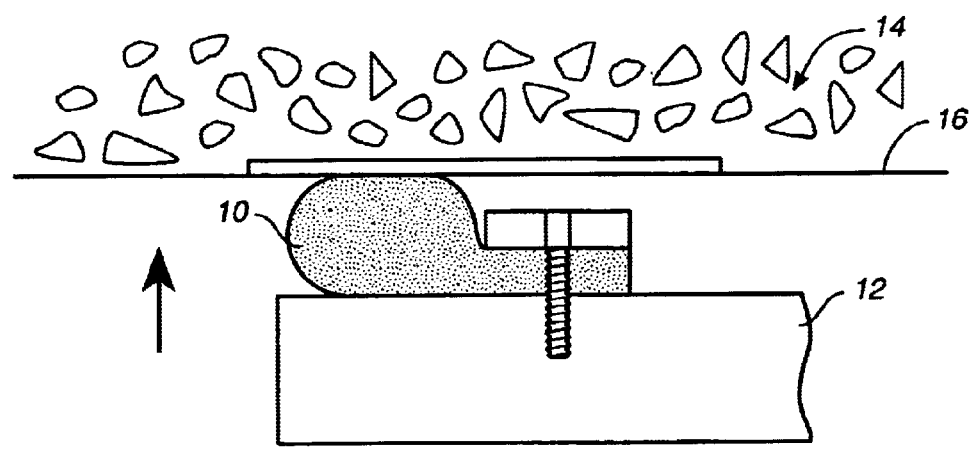
FIG._1B
(PRIOR ART)

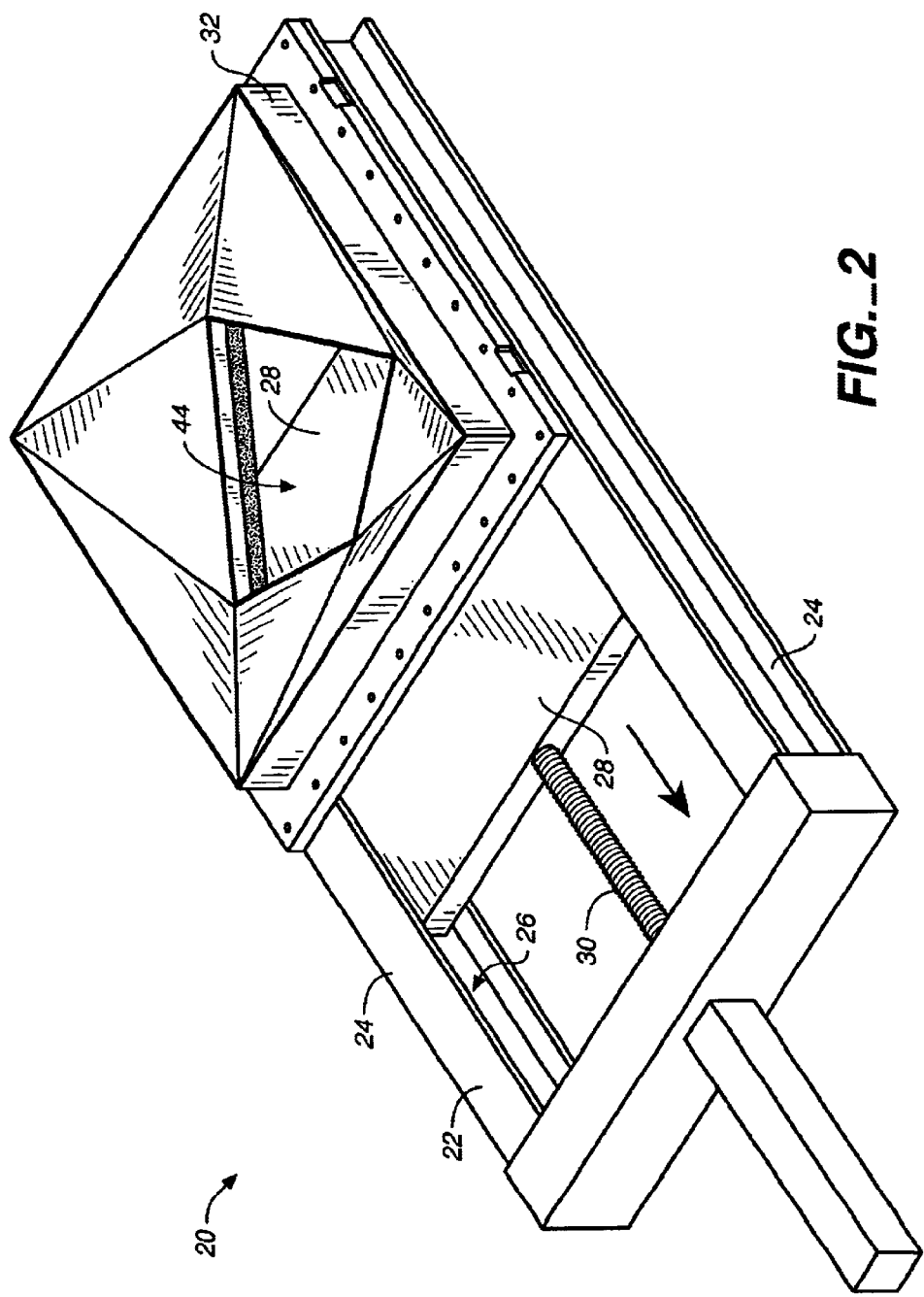
FIG._2

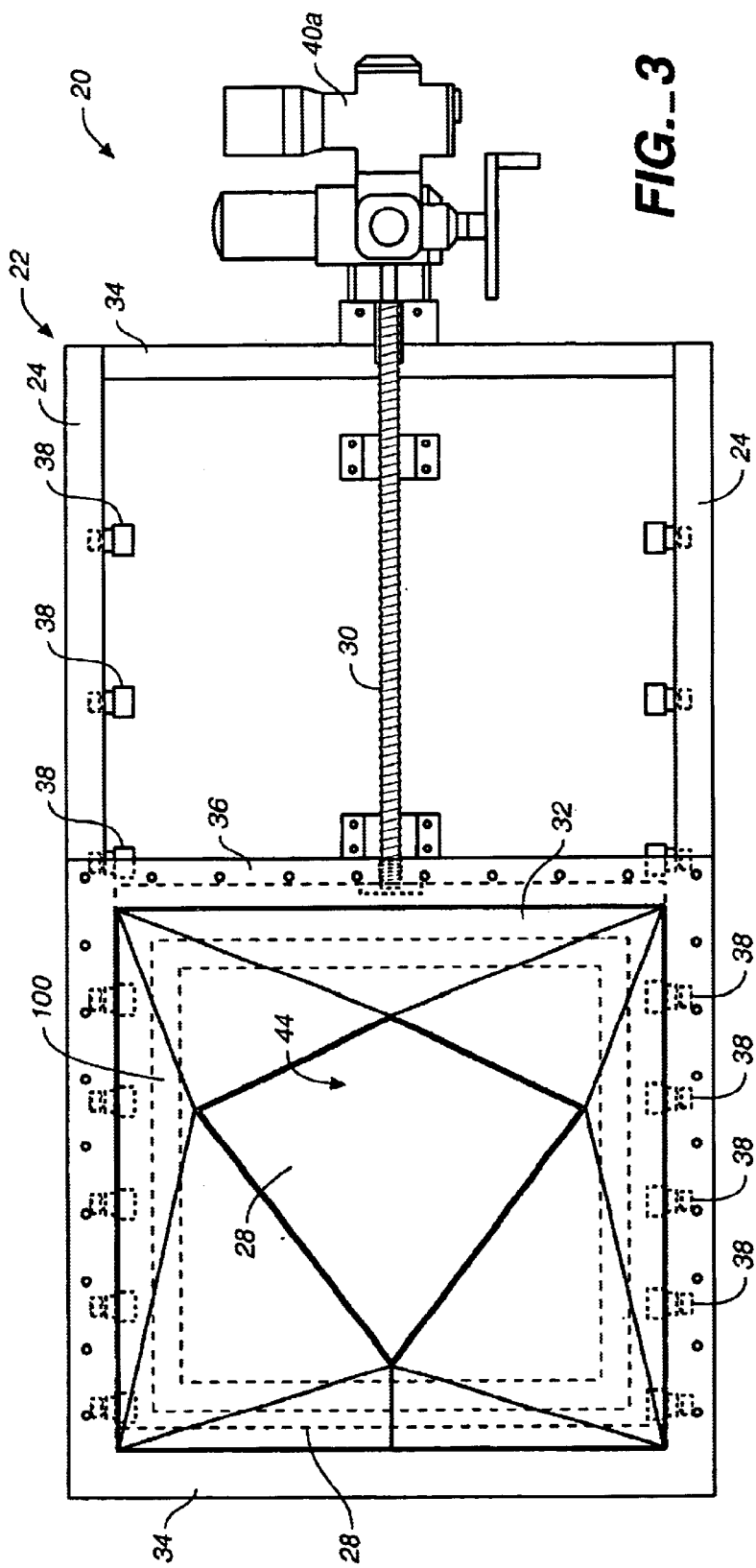
FIG._3

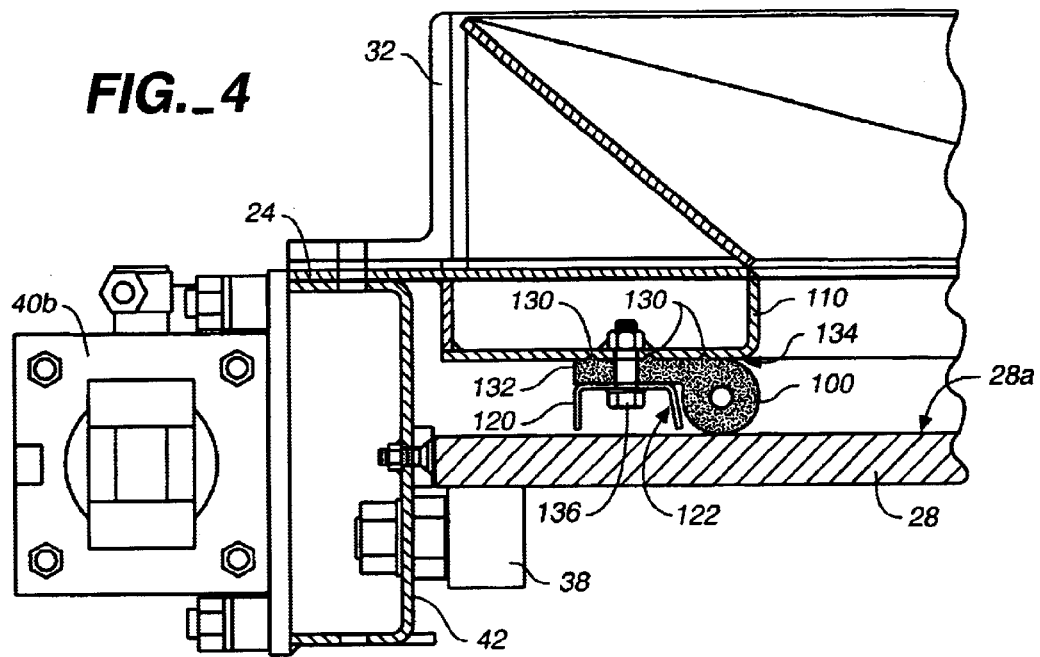
FIG._4
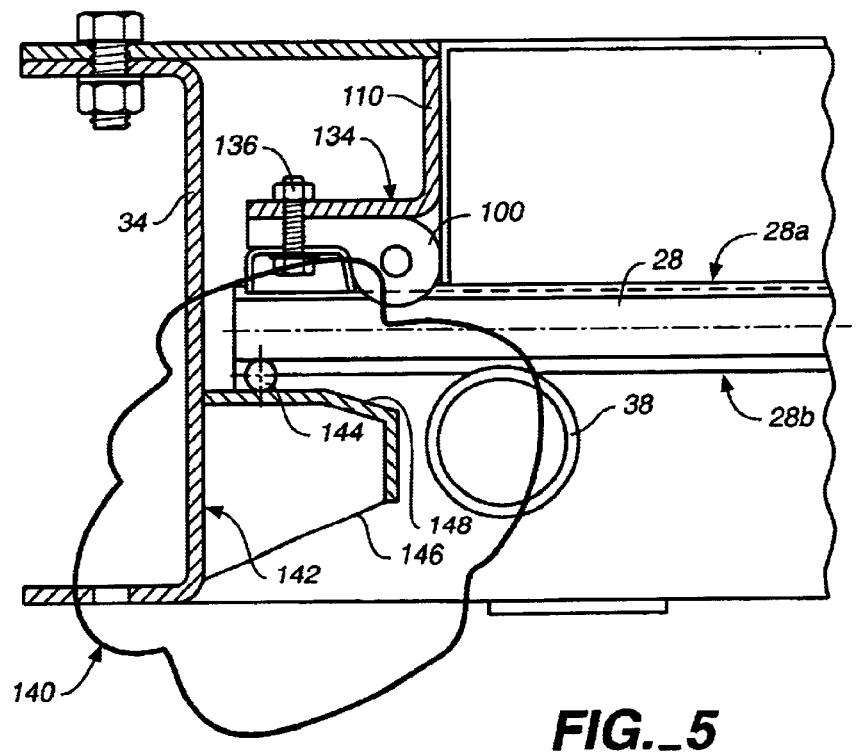
FIG._5

SLIDE GATE SEALING SYSTEM

CROSS REFERENCE TO RELATED APPLICATIONS

The present application claims the benefit of the filing date of U.S. Provisional/Utility Patent Application, Ser. No. 60/383,962, filed May 30, 2002.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to deformable seals for gates, and more particularly to a sealing apparatus for water and sewage treatment facility slide gates and sludge handling and dewatering system load-out slide gates.

BACKGROUND INFORMATION AND DISCUSSION OF RELATED ART

Slide gates are widely employed to control fluid flow through fluid passages, especially in water and sewage treatment facilities and in dewatering and sludge handling environments. Slide gates typically comprise a frame having channels in which a slide gate door is mounted for selective movement to define either an opening or a closure. A seal of some kind is provided to create a watertight seal between the gate and the frame. An ideal seal minimizes frictional resistance to gate movement while maximizing seal durability and seal effectiveness.

While the art is not new, there have been many recent improvements in slide gate seal design. Exemplary and illustrative improvements are shown in the following U.S. Patents.

U.S. Pat. No. 4,226,553, to Whipps et al, shows a slide gate mechanism comprising a frame, a gate mounted to the frame and adapted for vertical movement to open or close the opening in the frame, actuating means for moving gate, and a seal mounted in the frame assembly for providing a watertight seal between the gate and the frame assembly when the gate is closed. The seal comprises a sealing member having an offset bulb portion and means for mounting the sealing member to the frame assembly.

U.S. Pat. No. 4,848,962, to Whipps, discloses a purported improvement over the sealing system of the earlier Whipps et al patent. What is shown is a slide gate having a frame assembly formed from interconnected extruded members formed with a substantially U-shaped channel, and a sealing member seated within the U-shaped channels. A side seal is seated in each side member of the frame assembly. Each side seal has a pair of U-shaped channels defining a double U-shaped channel formed by a pair of sidewalls with a common wall between the sidewalls. The common wall has a bulbous upper portion. The interior surface of one U-shaped channel has a lip seal in the form of a pair of inwardly extending lips that face the bulbous portion of the common wall. The slide gate is received in sealing engagement between the lip seal and the bulbous portion. The exterior sidewalls of each side seal has a plurality of barbed ribs which accommodate irregularities in the channels formed in the extruded frame assembly. A lower seal is seated in the bottom of the frame assembly for sealing the lower end of the slide plate when the slide plate is in its closed position. In certain applications, a horizontally extending upper seal in the form of an adjustable lip seal provides sealing contact between a top frame member and the slide plate.

In yet another patent to Whipps, U.S. Pat. No. 6,176,493 teaches a seal assembly for slide gates comprising a seal having a base section, and first, second and third mutually spaced sections integral with the base section. The first and second sections define a slide-receiving channel and the second and third sections define a tapered wedge-receiving channel. A tapered wedge member is disposition in the wedge-receiving channel. The seal and wedge are attached to a gate slide guide in such a fashion that the wedge is retained at a selected depth in the wedge-receiving channel. The seal is made of a material that allows the second section to flex away from the first section and toward the third section under a flexing force produced by the wedge member acting on the second and third sections, thereby causing the first and second sections of the seal to engage opposite surfaces of a slide disposed in the slide-receiving channel, with the first and second sections forming a watertight sliding seal with the inserted slide.

U.S. Pat. No. 4,700,927 to Henderson, teaches an open channel slide gate having a frame made up of parallel channel guides extending vertically from a horizontal bottom to define a gate opening. The channel guides have first and second guide flanges protruding laterally into the gate opening. A gate disc is supported by the frame for vertical movement between a lowered/closed position and an open position. The gate disc has side portions between the first and second guide flanges, and the side portions carry seal assemblies. Vertically spaced pivotal pressure pads are mounted on each of the channel guides between their respective first and second guide flanges. Adjustable mechanisms are employed to pivotally adjust the pressure pads to bear against the disc side portions when the disc is in its lowered position, with the result that the seal assemblies are compressed between the disc side portions and the first guide flanges. Each seal assembly comprises a flexible sealing element having an elongated body extending vertically along each disc side portion, with a pair of mutually spaced lips. A retainer bar extends along the sealing element between the lips. When the gate disc side portions are urged towards the first guide flanges as a result of the seating force generated by the pivotal pressure pads, the sealing lips deflect outwardly with respect to each other against the first guide flanges until those flanges contact the retaining bars.

The foregoing art is known to provide some advantages over the prior art; but it has not adequately addressed certain limitations in conventional slide gate seal design. Primary among the limitations in the prior art is the failure to provide means for pre-loading the seal so that a positive seal can be maintained at all times during the opening and closing of the gate. This configuration also serves as a superior cleaning function to maintain the sealing surface between the gate blade and the seal and ensures that the sealing surfaces of the gate and blade are not compromised by product intrusion.

BRIEF SUMMARY OF THE INVENTION

The slide gate sealing system of the present invention incorporates numerous sealing concepts which, combined into a system, provides a positive, watertight seal for slide gates used in water and sewage treatment facilities and, more particularly, in a dewatering sludge handling application. The sealing system can be utilized in any shape or size of slide gate opening and is especially effective where the slide gate is heavily loaded by a large head of material. A gate of this type is described in pending U.S. Pat. No. 6,508,387, to the instant inventor and others, which is incorporated in its entirety by reference herein. The present inventive sealing system is also effective where there is a requirement that the slide gate provide a leak proof seal when the application calls for the slide gate to span a large distance in the transverse direction to the open and closed direction of the gate.

It is therefore an object of the present invention to provide a new and improved slide gate sealing system.

It is another object of the present invention to provide a new and improved slide gate seal that employs a ramping cam to pre-load a ball seal and thereby creates a watertight seal when the slide gate blade is in a closed position.

A further object or feature of the present invention is a new and improved slide gate sealing system that is easy to install, replace, and maintain.

An even further object of the present invention is to provide a novel slide gate sealing system that is inexpensive to manufacture and is amenable to easy dimensional modification for custom installations.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trade-mark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL VIEWS OF THE DRAWINGS

FIGS. 1A and 1B a detailed side view in elevation contrasting use of the ball seal in the prior art with that of the present inventive system;

FIG. 2 is a perspective view of a representative type of slide gate in connection with which the inventive sealing system is employed;

FIG. 3 is an upper plan view showing the general orientation and positioning of the inventive sealing system ball seal relative to a slide gate blade in a closed position;

FIG. 4 is a detailed cross-sectional view in elevation of the slide gate sealing system of the present invention as viewed from the end of the slide gate; and FIG. 5 is a detailed cross-sectional view in elevation of the ramping mechanism of the present invention, as viewed from the side of the slide gate.

DETAILED DESCRIPTION OF THE INVENTION

The invention will be better understood and objects other than those set forth above will become apparent when consideration is given to the following detailed description thereof. Such description makes reference to the annexed drawings, FIGS. 1A–5, wherein like reference numerals refer to like elements in the various views.

FIG. 1 shows several ways in which ball seals are ineffectively employed in the prior art. It will be seen that a ball seal, sometimes referred to as a "J" seal or a "Note" seal, is used in the present inventive system in an unconventional way. Prior art manufacturers recommend that the seal 10 be used as shown in the FIGS 1A and 1B, i.e., with the slide plate 12 pressing against the ball seal 10 and using the force generated by the media pressure 14 on the underside 16 of the seal plate 16 to ensure that positive contact is made and that the seal is compressed. They also recommend against the use of the ball seal as a seal for a sliding member application.

FIGS. 2 and 3 show a representative slide gate 20 of the kind for which the inventive sealing system is adapted for use, FIG. 2 being a perspective view showing the slide gate in a partially open configuration, and FIG. 3 being a top plan view showing the slide gate in a closed configuration. The gate includes a substantially rectangular frame 22, including longitudinal rails 24 having interior channels 26 (either defined by the rail shape or formed with structure affixed to the rails. A slide gate blade 28 is disposed or mounted within the interior channels of the longitudinal rails. Slide gate blade movement is actuated by a center threaded spindle 30, which may be manually or power driven by gate actuation means 40*a*. As is well known, other slide gate actuation means may be installed, such as hydraulic or pneumatic pistons (40*b*), and such means may be installed to the side of the frame assembly, rather than at the substantial center of a frame end (see FIG. 4).

Referring again to FIGS. 2 and 3, an inlet funnel 32 may be included to direct flow of media into and through the passage created by an open slide gate. Horizontal end frame members 34 and intermediate horizontal frame member 36 are connected to the longitudinal rails, preferably with bolts and/or welds, though any suitable connection means may be employed. Slide gate blade 28 is supported on a slide gate roller assembly comprising a plurality of slide gate blade rollers 38 which permit free movement of the blade in both directions when actuated by the gate actuation means 40a, 40b. The rollers are affixed to the interior sides 42 of the longitudinal rails.

FIG. 3 shows (in phantom) the general configuration and position of the sealing system ball seal 100 of the present invention. As will be appreciated, the ball seal extends on four sides around and beyond the edges of the media inlet opening 44 defined by the media inlet funnel and open blade. It is preferably disposed on the seal mounting frame 110 such that two opposing sides are substantially parallel to the longitudinal rails 24 and two other opposing sides are substantially parallel to the intermediate and end horizontal frame members 34, 36, though it may be otherwise configured. Accordingly, the seal mounting frame 110 is disposed within a region defined by the longitudinal rails and the horizontal frame member and one of the horizontal end frame members. Preferably, the seal mounting frame has at least four sides, two of which are substantially parallel to the longitudinal rails 24 and two of which are substantially parallel to the intermediate and end horizontal frame members, 34, 36.

As shown in FIG. 4, it is an objective of the present inventive to employ a resilient ball seal 100 as a sealing device by configuring the seal mounting frame 110 so that the slide gate blade 28 can be located with respect to the ball seal such that the seal is "pre-loaded" and always in contact with the slide gate blade. This permits sealing of the gate on the topside 28a of the slide gate blade. To this objective, the present inventive system also uses a seal retainer 120 to retain the ball seal 100 from extruding or moving under pressure and to hold it in place while the gate is either opening or closing. In addition, the seal retainer is designed such that as pressure on the seal increases, the seal retainer creates an improved and tighter seal by corralling the ball seal and directing its deformation while under pressure against the slide gate blade 28 rather than allowing it to extrude back through the low pressure side 122 of the retainer.

The present invention further includes a system of isolation dams 130 on the mounting tail 132 of the ball seal 100. Preferably, the isolation dams comprise ridges extending transversely across the entire mating surface 134 of the ball seal 100, the mating surface being in surface-to-surface contact with the seal mounting frame 110. This ensures that media (e.g., sludge), under pressure, does not migrate between the mating surface 134 of the ball seal 100 and the seal mounting frame 110. Without the isolation dams, and because the ball seal is secured to the mounting frame by fasteners 136, media could potentially migrate between the mating surfaces and also through the mounting holes in the mounting frame. The isolation dams will eliminate this source of leakage.

The sealing system utilizes a ramping mechanism 140 that involves cooperation of the slide gate blade 102 and structure affixed to the interior side 142 of the horizontal end frame member 34 to provide an additional positive seal when the gate is in the closed position (see FIG. 5). This mechanism employs a section of round material 144 attached to the underside 28b of the slide gate blade, that will slide upward on a ramping cam 146, attached to the gate frame, which has an inclined portion 148 upwardly inclined toward the horizontal end frame member 34, and which thereby gradually but positively urges slide gate blade 28 upwardly as the blade rolls nears its fully closed position. This provides a positive contact between the blade and seal in the transverse direction when the gate is in the fully closed position.

The gate, in its standard configuration, is supported on it sides by slide gate blade rollers 148 or slide plates. Under pressure, these support devices will restrict the deflection of the slide gate blade under pressure and will maintain a positive contact between the ball seal and the slide gate blade in the longitudinal direction of the slide gate blade travel.

The ramping system described above will provide a positive contact between the slide gate blade and the ball seal in the transverse direction of the gate. Since the slide gate blade, in the closed position, is now supported on all four sides, deflection of the slide gate blade under pressure is minimized. Also, since the support of the blade is on four sides, the overall deflection of the slide gate blade is reduced, allowing a thinner or less costly material to be used for the slide gate blade.

Definitions: As used herein, the following terms have the indicated meanings.

Ball seal: a device made of a pliable or flexible material such a rubber, Buna N or Neoprene-like material that is used as a seal in gates employing the inventive seal.

Slide Gate Blade: a plate that is moved back and forth by mechanical or electrical devices to provide an open or closed condition for the slide gate. In the closed mode of the gate, it is in contact with the ball seal.

Gate Frame: the structure that supports the slide gate blade, rollers or slides, the ball seal and its mounting frame, the ball seal retainer, the ramping mechanism, the slide gate blade actuators, and other miscellaneous mechanical and electrical devices that are required to make the system operate.

DRAWING REFERENCE NUMERALS
FIGS. 1A–4
10 prior art seal
12 slide plate (prior art)
14 media pressure (on slide plate)
16 seal plate underside
20 slide gate
22 slide gate frame
24 longitudinal rails
26 interior channels
28 slide gate blade
28a top side of slide gate blade
28b underside of slide gate blade
30 threaded spindle
32 media inlet funnel
34 horizontal end frame members
36 intermediate horizontal frame member
38 slide gate blade rollers
40a,b actuation means
42 interior sides of longitudinal rails
44 media inlet opening
100 ball seal
110 seal mounting frame
120 seal retainer
122 low pressure side of seal retainer
130 isolation dams
132 mounting tail of ball seal

134 mating surface of ball seal
136 fastener
140 ramping mechanism
142 interior side of horizontal end frame member
144 round material
146 ramping cam
148 inclined portion of ramping cam The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed as suitable, without departing from the true spirit and scope of the invention. Such changes might involve alternative materials, components, structural arrangements, sizes, shapes, forms, function, operational features or the like.

Therefore, the above description and illustrations should not be construed as limiting the scope of invention, which is defined by the appended claims.

What is claimed as invention is:

1. A slide gate sealing system for use in a slide gate to provide a positive seal between a slide gate blade and a slide gate frame, wherein the slide gate includes a frame having longitudinal rails, at least one intermediate horizontal frame member, and at least two horizontal end frame members having interior sides, a slide gate blade having a topside and an underside and being disposed within the interior sides of the longitudinal rails and having an open and a closed configuration, slide gate blade actuation means, a media inlet opening, and a plurality of slide gate blade roller assembly affixed to the interior sides of the longitudinal rails, said sealing system comprising:

a seal mounting frame having at least four sides and being disposed between the longitudinal rails, the intermediate horizontal frame member, and one of said horizontal end frame members;

a ball seal having a mounting tail with a mating surface and at least four sides, said ball seal mounted on said seal mounting frame such that said mating surface is in surface-to-surface contact with said seal mounting frame, said sides of said ball seal being disposed outside the edges of the media inlet opening;

a seal retainer to retain said ball seal from extruding or moving under pressure, to hold it in place while the slide gate blade is either opening or closing, and to control the deformation of said ball seal while said ball seal is under pressure against the slide gate blade; and at least one isolation dam on said mating surface.

2. The apparatus of claim 1, further including a ramping mechanism affixed to the interior side of the horizontal end frame member.

3. The apparatus of claim 2, wherein said ramping mechanism comprises:

a section of round material attached to the underside of the slide gate blade;

a ramping cam affixed to the interior side of the horizontal end frame member and having an inclined portion upwardly inclined toward the horizontal end frame member, wherein when the slide gate blade is moved toward a closed position, said round material and said inclined portion cooperate to urge the slide gate blade upwardly such that the topside of the slide gate blade comes into positive contact with said ball seal.

* * * * *